Jan. 11, 1938.　　　　C. G. ULLIN　　　　2,105,207
FISH CLEANING AND FILLETING MACHINE
Filed April 1, 1935　　　3 Sheets-Sheet 1

INVENTOR
Carl G. Ullin
BY
ATTORNEY

Jan. 11, 1938.                C. G. ULLIN                 2,105,207
                   FISH CLEANING AND FILLETING MACHINE
                        Filed April 1, 1935        3 Sheets-Sheet 2

Fig. 2.

INVENTOR
Carl G. Ullin
BY
Edward E. Barner
ATTORNEY

Jan. 11, 1938.  C. G. ULLIN  2,105,207
FISH CLEANING AND FILLETING MACHINE
Filed April 1, 1935  3 Sheets-Sheet 3
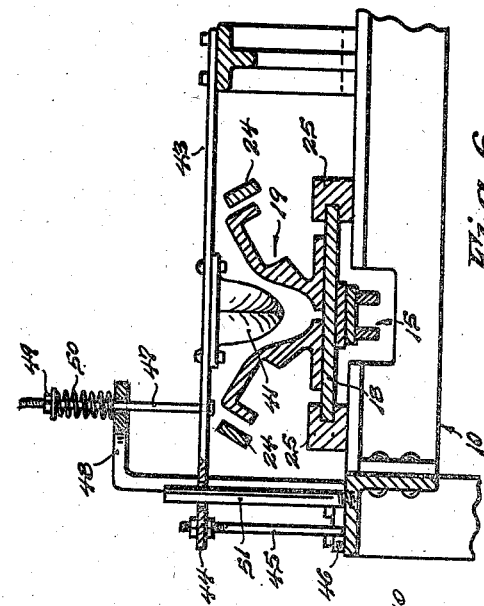
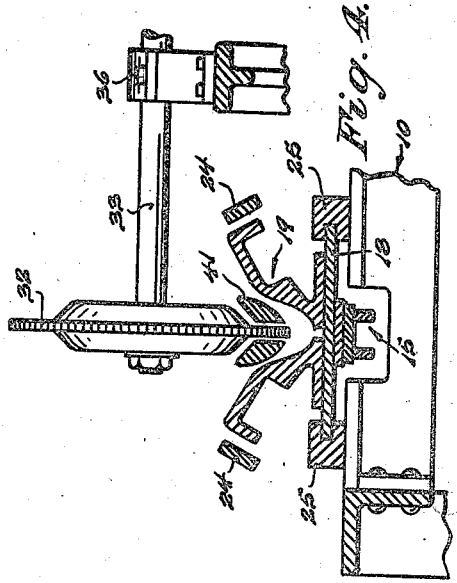
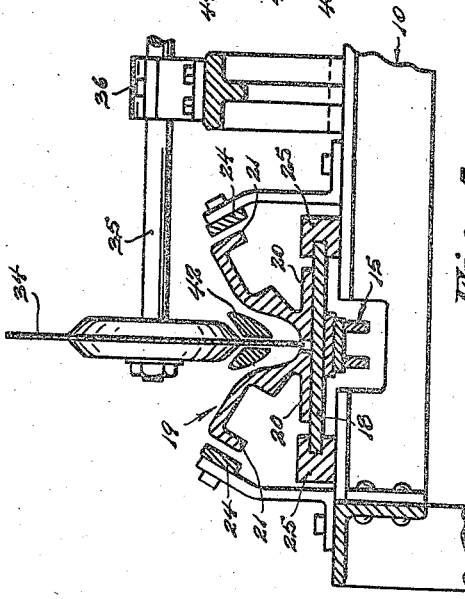
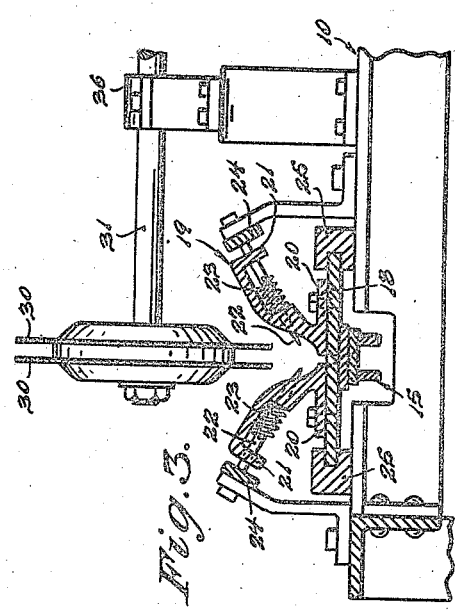
INVENTOR
Carl G. Ullin
BY
ATTORNEY Patented Jan. 11, 1938

2,105,207

UNITED STATES PATENT OFFICE 2,105,207

FISH CLEANING AND FILLETING MACHINE

Carl G. Ullin, Seattle, Wash.

Application April 1, 1935, Serial No. 14,095

11 Claims. (Cl. 17—3)

This invention relates to improved mechanism for cleaning and filleting fish, the invention operating to slime the fish, remove the back-bone therefrom, and split the fish for fillet purposes and, in the performance of such work, eliminate any possibility of bruising or otherwise marring the meat.

Specific objects and advantages of the invention will become apparent in the course of the following detailed description and in the claims annexed thereto, the invention consisting in the novel construction, adaptation, and combination of parts hereinafter described and claimed and in the improved method by means of which the desired work is performed.

In the drawings:

Fig. 2 is a top plan view thereof, the water supply line and nozzles represented in the preceding view being deleted for purposes of simplicity.

Fig. 3 is a fragmentary transverse vertical section taken to an enlarged scale on the line 3—3 of Fig. 2 with the cutter mechanism by means of which a strip is removed from the belly of the fish being shown in elevation.

Figure 1:
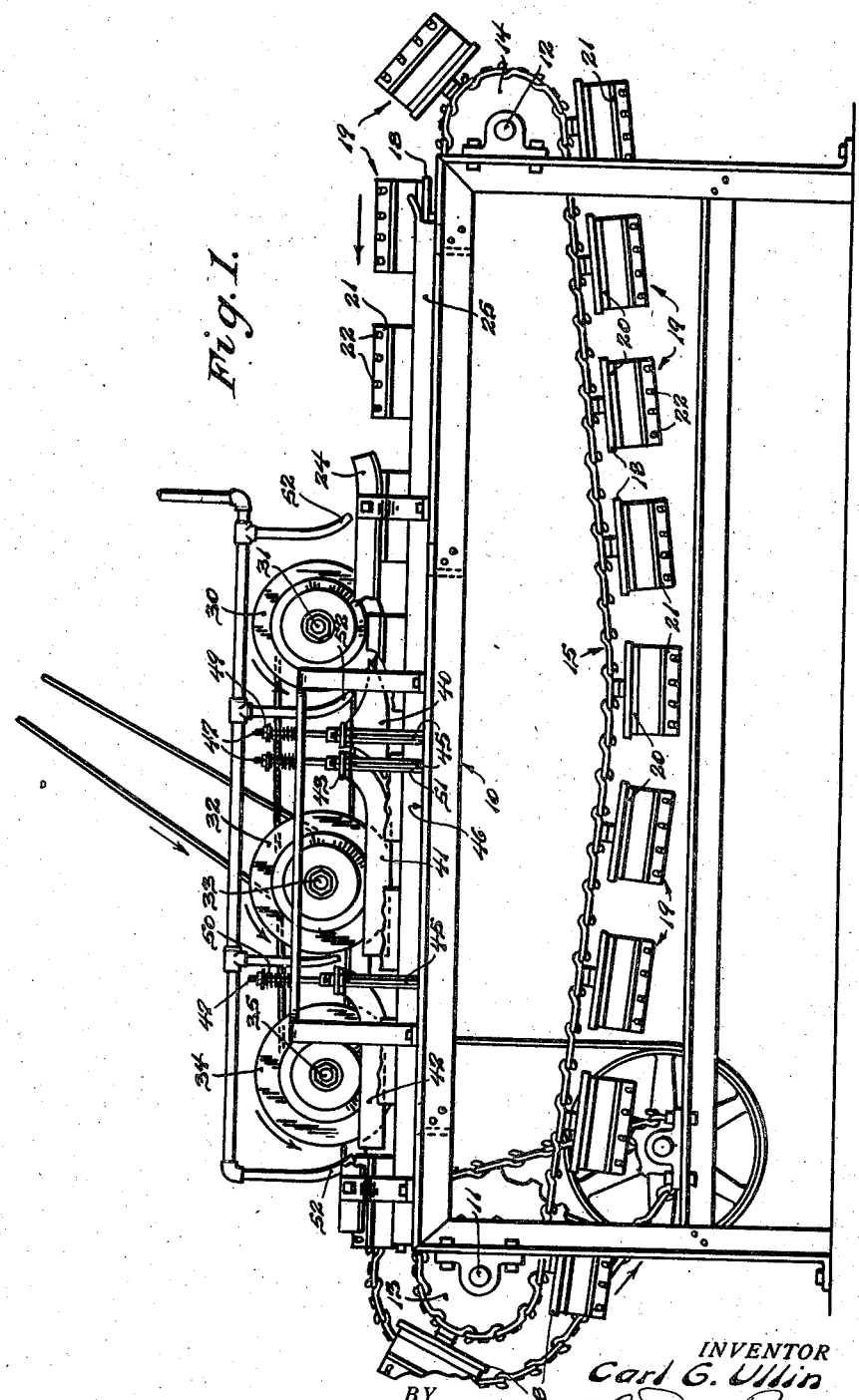
Figure 1 is a side elevation of the machine in its now preferred form, parts being broken away to better illustrate the plow mechanism by means of which the sides of the fish are spread laterally from one another to expose the entrail cavity.

Figs. 4 and 5 are fragmentary transverse vertical sections taken on broken lines 4—4 and 5—5 of Fig. 2 and respectively indicating the bone-removing and filleting cutters; and Fig. 6 is a fragmentary transverse vertical section taken on line 6—6 of Fig. 2 to indicate the general formation of the several plows and the manner of supporting the same.

Having reference to said drawings, the numeral 10 represents the machine frame which extends longitudinally and supports a pair of horizontal transversely disposed shafts 11, 12 at the two opposite ends serving to revolubly carry respective sprocket wheels 13, 14. Received over said sprocket wheels is an endless chain 15 which, at spaced intervals, is provided with cross bars overlying the parallel links. Bolted or otherwise secured to the cross bars are plate members 18 on which are mounted fish-carrying buckets represented generally by 19, the buckets comprising companion blocks each formed with a foot member 20 laterally adjustable on the plates to retain a channel between the same and providing, above the channel, fish-receiving gulleys of a relative semi-circular configuration in transverse section, said companion blocks above the gulley diverging outwardly from one another and terminating in down-turned ribs 21. For slide movement at an inclination of approximately 30° from the horizontal through said ribs and the gulley-forming side walls of the blocks are pins 22, said pins as the buckets travel longitudinally of the frame between cam-forming side bars 24 being operated in opposition to springs 23 into impinging relation to the flanks of the fish. The pins at one end of the buckets are of a length greater than the pins at the opposite end to conform to the taper of the fish. Operating as guides to support the buckets in their travel between the cams are channeled bars 25 receiving the lateral edges of the bucket-carrying plates 18.

In the longitudinal travel of the fish with the pins gripping the same against dislodgement, the invention provides means whereby cutter devices remove a strip from the belly of the fish to remove the ventral and anal fins together with the entrails, following which the fish is spread to open the entrail cavity with cutter devices successively removing the exposed back bone and slitting the fish on the longitudinal median line, the cutting plane of these successive devices being stepped progressively to properly locate the same relative to the work.

More especially thereto, the belly-slitting devices comprise a pair of saws 30 spaced to lie at opposite sides of the longitudinal median line of the fish and revolubly supported on a common arbor 31, the bone-removing cutter comprising a relatively wide saw 32 revolubly supported on an arbor 33, and the filleting cutter comprising a saw 34 revolubly supported on an arbor 35, said arbors being journaled in suitable bearings 36 and being driven through a plurality of endless belts 37 from a source of power (not shown) common to the chain 15.

Located to extend from a point immediately following the saws 30 to the rear-most point of operation following the saw 34 are devices for spreading the sides of the fish to expose the entrail cavity, said devices comprising a plurality of yieldably-mounted plow members 40, 41, and 42 which, as indicated, are suitably slotted for the reception of the respective saws and formed at the leading ends with relatively sharp prows. Supporting said plows I represent spring leaves 43 boltably secured at the inner ends with the outer free ends 44 being provided with vertical foot-rods 45 arranged for vertical adjustment relative to a horizontal surface 46 on which the same seat for locating the plows at a pre-determined elevation above the floor of the buckets. In offsetting the weight of the plows to increase the sensitivity of the supporting leaves 43, rods 47 extend upwardly from the leaves through stationary arms 48 with the upper ends being threaded for the reception of nuts 49, said nuts acting to regulate the tension of elevating springs 50. Guide rods for the free ends of the spring leaves 43 are indicated at 51.

With their object that of projecting streams of water from a pressure source of supply over the entrail cavities of the fish as well as flushing the operating surfaces of the machine, the invention further provides a plurality of jet nozzles 52 which are indicated as being located in advance of and following the saws 30 and rearwardly of each of the saws 32 and 34 on the longitudinal median line of the machine.

In operation, the fish are manually or otherwise placed with their heads foremost and bellies up in the gullies of the successive buckets, being impinged by the pins 22 as the buckets are fed between the cams 24 and past the successive saws 30, 32, and 34, the fish in their travel from one to the other end of the machine being opened by the saws 30 and spread by the plows 40, 41, and 42 during the time interval in which the backbone is removed and the fish split. The entrails, being attached to the strip which is removed by the saws 30, are projected by the saws into the space in advance of the following bucket with the leading nozzle operating to wash the same into a trough (not shown) located below the machine. It is to be noted, in connection with the removal of the entrails, that the leading plow 40 by means of its furrowing action through the entrail cavity of the fish co-acts with the saws 30 in dislodging the entrails.

Where filleting is not desired, the saw 34 may be readily removed in which arrangement the machine is utilized for cleaning purposes only.

The disclosure permits of numerous modifications and it is my intention that the invention be confined only within the broad spirit of the invention as expressed by the hereto annexed claims.

What I claim, is:—

1. In a fish-cleaning and filleting machine, the combination with the machine frame, an endless chain arranged longitudinally of the frame, sprocket wheels therefor carried by the frame, and means for driving the sprocket wheels, of carriers for the fish supported in spaced relation on said chain, said carriers having a V-shape in transverse section within the trough of which carriers the fish are adapted to be deposited with the bellies uppermost, a plurality of normally open fish-gripping pins carried by the respective carriers for relative closing and opening movements transversely of the machine responsive to the travel of the carriers longitudinally of the frame, a pair of laterally spaced circular saws supported in the path of travel of the fish on said carriers for cutting a medial strip from the bellies of the fish, a member yieldable upwardly and operating subsequent to said cutting operation to spread the sides of the fish for exposing the entrail cavity, a saw supported in the path of travel of the fish on the carriers for removing the exposed back bone, a circular saw also supported in the path of travel of the fish on said carriers for splitting the fish along the back of the same to sever the two sides from one another, and means for delivering streams of water through said entrail cavity of the fish coincident with the travel of the fish longitudinally of the frame for washing the same.

2. In a fish-cleaning machine, the combination with a machine frame, an endless chain arranged longitudinally of the frame, sprocket wheels therefor carried by the frame, and means for rotating the sprocket wheels for driving the chain, carrier devices for the fish supported at spaced intervals of the chain length, said carriers having a V-trough within which the fish are adapted to be deposited with the bellies uppermost, a plurality of normally open fish-gripping pins carried by the respective carriers for relative closing and opening movements transversely of the machine responsive to the travel of the carriers longitudinally of the frame, a pair of laterally spaced circular saws supported in the path of travel of the fish on said carriers for cutting a medial strip from the bellies of the fish, a member operating subsequent to said cutting operation to spread the sides of the fish for exposing the entrail cavity, and a saw supported in the path of travel of the fish on the carriers for removing the exposed back-bone of the fish.

3. In a fish-cleaning and filleting machine, a frame, carriers for the fish supported for movement longitudinally of the frame, fish-gripping devices carried by the carriers arranged for closing and opening movements transversely of the frame to engage and release the fish responsive to the travel of the carriers longitudinally of the frame, and means operative on the fish and responsive to the longitudinal travel of the same for successively removing the fish entrails together with a strip from the belly of the fish to which the entrails are attached, spreading the sides of the fish to expose the entrail cavities, removing the exposed back-bones, and splitting the fish to sever the sides from one another.

4. In a fish-cleaning and filleting machine, a frame, a carrier for the fish supported for movement longitudinally of the frame, fish-gripping means carried by the carrier and arranged for relative closing and opening movements transversely of the frame to engage and release the fish responsive to the travel of the carrier longitudinally of the frame, and means operative on the fish and responsive to the longitudinal travel of the carrier for performing the following operations: cutting a strip from the belly of the fish without severing the same from the entrails, removing said strip and the entrails, removing the back-bone, and splitting the fish to sever the sides from one another.

5. In a fish-cleaning and filleting machine, the combination with the machine frame, rotary cutting devices supported by said frame for movement in parallel planes and about a common axis for removing a strip from the belly of the fish, removing the back-bone, and severing the sides from one another, and means for feeding the fish through said cutting devices.

6. In a fish-cleaning machine, in combination with means for slitting the belly of the fish to cut a medial strip therefrom in which is included the ventral fin, the anal fin, and the entrail connection, said slitting being vertically as respects the fish whereby to prevent a severing of the strip from the entrails, and a furrowing device acting to enter the entrail cavity of the fish to force the entrails and said strip from the same, and means supporting said furrowing device for yieldable movement to accommodate variation in the size of the fish being cleaned.

7. The method of cleaning a fish which consists in collectively removing the entrails and a belly strip in which is included the ventral fin, the anal fin, and the entrail connection, spreading the sides of the fish to expose the entrail cavity, and projecting a pressure stream of water through the exposed cavity.

8. In a machine for cleaning fish in which the belly of the fish is slit, an arm member having spring characteristics secured at its inner end with its outer free end overlying the path of travel of the fish, a plow device suspended by said arm member to locate the same in the path of travel of the fish to pass the plow device through the entrail cavity of the fish, and a spring engaging the free end of said arm member to counteract the weight of the plow device for increasing the sensitivity of the arm member.

9. In a fish-cleaning machine, in combination with the machine frame, an endless chain, sprocket wheels for the chain supported by the frame, and means for rotating the sprocket wheels for driving the chain, a plurality of blocks, one for each fish, carried by the chain and formed to a relative V-shape in transverse section for the reception of the fish in the troughs of the blocks, a plurality of transversely disposed fish-impinging pins carried by the blocks at opposite sides of the fish-receiving trough to normally project their outer ends laterally from the blocks, springs influencing said pins outwardly, and a cam supported by the frame at opposite sides of the path of travel of the blocks for engaging said projecting ends of the pins in response to the travel of the blocks for closing the pins relatively one with another in opposition to the springs for impinging the fish, said pins being disposed at an angle of approximately 30° from the horizontal to influence the fish toward the floor of the blocks.

10. In a fish-cleaning machine, the combination, with a machine frame, of fish-carrying devices movable relative to the frame, and means supported by said frame to lie in the path of travel of the fish with said carrier devices for performing in sequence the following operations:—(1) removing the fish entrails and a strip from the belly of the fish to which the entrails are attached, (2) spreading the sides of the fish to expose the back-bone, and (3) removing the exposed back-bone.

11. The method of cleaning a fish which consists in the steps of cutting a strip from the belly of the fish to which is attached the entrails, dislodging the strip and the attached entrails collectively, and washing the entrail cavity from which the entrails have been removed.

CARL G. ULLIN.